United States Patent [19]
Hurst et al.

[11] Patent Number: 6,011,788
[45] Date of Patent: Jan. 4, 2000

[54] S-CDMA FIXED WIRELESS LOOP SYSTEM EMPLOYING SUBSCRIBER UNIT/RADIO BASE UNIT SUPER-FRAME ALIGNMENT

[75] Inventors: Michael Hurst, S. Jordan; Johnny Harris, Centerville; Dan M. Griffin, Bountiful; Lee Butterfield, W. Jordan; Thomas R. Giallorenzi, Herriman; Kyle L. Henderson, Salt Lake City, all of Utah

[73] Assignee: L-3 Communications Corporation, New York, N.Y.

[21] Appl. No.: 08/987,815

[22] Filed: Dec. 10, 1997

[51] Int. Cl.[7] .................................................. H04B 7/216
[52] U.S. Cl. .......................... 370/335; 370/320; 370/503; 370/342
[58] Field of Search .................................... 370/320–321, 370/324, 326, 335, 337, 342, 350, 252, 503, 506, 508

[56] References Cited

U.S. PATENT DOCUMENTS

| | | | |
|---|---|---|---|
| 5,499,236 | 3/1996 | Giallorenzi et al. | 370/18 |
| 5,583,853 | 12/1996 | Giallorenzi et al. | 370/441 |
| 5,673,260 | 9/1997 | Umeda et al. | 370/342 |
| 5,914,944 | 6/1999 | Haugli et al. | 370/321 |
| 5,920,551 | 7/1999 | Na et al. | 370/335 |

*Primary Examiner*—Chi H. Pham
*Assistant Examiner*—Maikhanh Tran
*Attorney, Agent, or Firm*—Perman & Green, LLP

[57] ABSTRACT

A method is disclosed for operating a synchronous Code Division Multiple Access (S-CDMA) radio frequency communication system having a host transceiver unit and a plurality of user transceiver units. The method includes an initial step of defining a super-frame to be comprised of N sequential frames of data. In the preferred embodiment N is equal to three. For a user transceiver unit that obtains access to the host transceiver unit a next step of the method receives frames of data transmitted by the host transceiver unit and initially aligns a receiver timing and a transmitter timing of the user transceiver unit to a super-frame boundary of the received frames. A next step transmits frames of data from the user transceiver unit to the host transceiver unit using the initial timing alignment. A further step of the method detects at the host transceiver unit a difference between the arrival of the transmitted frames of data and a super-frame boundary and then transmits a timing correction parameter, preferably expressed in symbols, from the host transceiver unit to the user transceiver unit in order to align the transmitted frames of data to the super-frame boundary.

20 Claims, 7 Drawing Sheets

S-CDMA FIXED WIRELESS LOOP SYSTEM EMPLOYING SUBSCRIBER UNIT/RADIO BASE UNIT SUPER-FRAME ALIGNMENT

FIELD OF THE INVENTION

This invention relates generally to wireless local loop systems and, in particular, a fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant number of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber.

Broadly speaking, there are three main categories of fixed wireless solutions.

Fixed cellular systems are primarily based on existing analog cellular systems like AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density urban situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in synchronous CDMA (S-CDMA) fixed wireless loop systems is in finding an optimum timing between a system host transceiver and individual ones of a plurality of remote or user transceivers. If the timing is not optimum, then inefficiencies in communication result, which may act to reduce the overall system capacity.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide an improved fixed wireless loop system that operates by synchronizing subscriber units to system master timing at super-frame boundaries.

SUMMARY OF THE INVENTION

The foregoing and other problems are overcome and the objects of the invention are realized by methods and apparatus in accordance with embodiments of this invention.

In accordance with this invention a method is disclosed for operating a synchronous Code Division Multiple Access (S-CDMA) radio frequency communication system having a host transceiver unit and a plurality of user transceiver units.

The method includes an initial step of defining a super-frame to be comprised of N sequential frames of data. In the preferred embodiment N is equal to three. For a user transceiver unit obtaining access to the host transceiver unit, a next step receives frames of data transmitted by the host transceiver unit and initially aligns a receiver timing and a transmitter timing of the user transceiver unit to a super-frame boundary of the received frames. A next step transmits frames of data from the user transceiver unit to the host transceiver unit using the initial timing alignment. A further step of the method detects at the host transceiver unit a difference between the arrival of the transmitted frames of data and a super-frame boundary and then transmits a timing correction, preferably expressed in symbols, from the host transceiver unit to the user transceiver unit to align the transmitted frames of data to the super-frame boundary.

The steps of receiving and transmitting frames of data occur on an asynchronous side channel, and the method further includes a step of switching the communication between the user transceiver unit and the host transceiver unit from the asynchronous side channel to a synchronous communication channel, such as a synchronous traffic channel.

The step of defining a super-frame to be comprised of N sequential frames of data defines a first frame of the super-frame, in a direction from the host transceiver unit to the user transceiver unit, to have a synchronization field that differs from the synchronization field of each of the N−1 frames of data of the super-frame. The step of initially aligning includes a step of detecting the synchronization field of the first frame of the super-frame.

The method further includes a step of sending a message from a super-frame aligned user transceiver unit to the host transceiver unit using a Slotted ALOHA protocol. This step occurs on a synchronous side channel, and enables the user transceiver unit to obtain a communication channel for making a voice or a data call.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
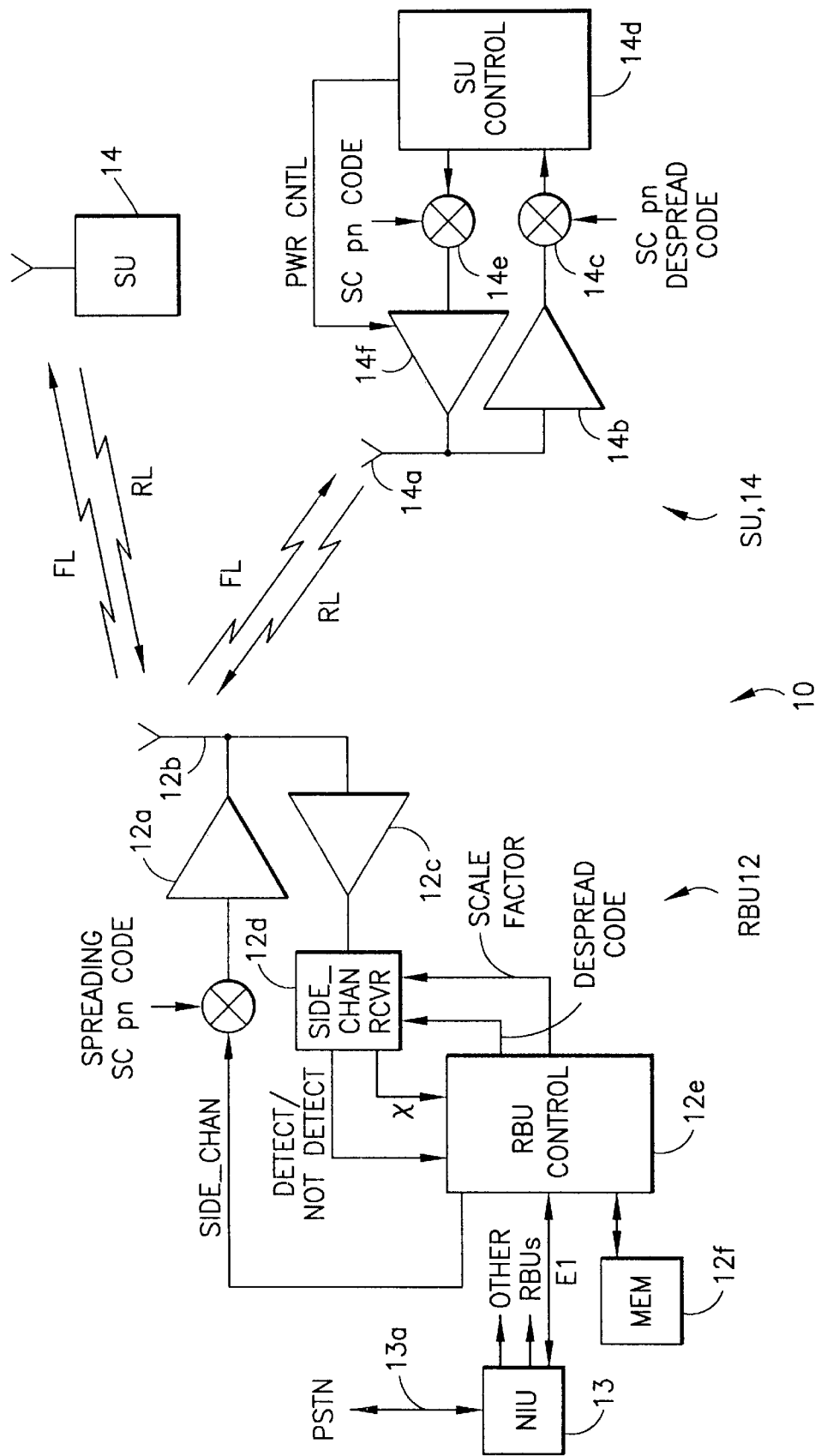
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value $\chi$, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In addition, the FWS 10 has an Element Management System or EMS (not depicted) that provides Operations, Administration, Maintenance, and Provisioning (OAM&P) functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be used for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
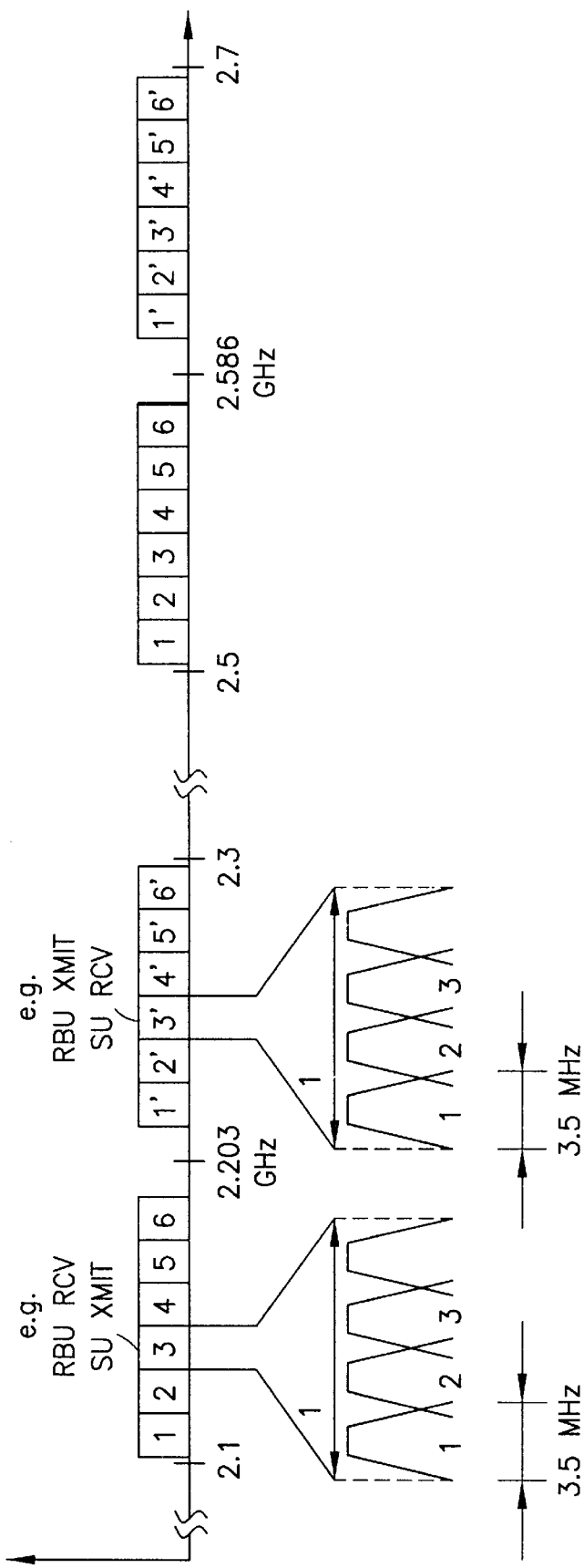
FIG. 2 is an exemplary frequency allocation diagram of the system of FIG. 1.

The SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bi-directional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel codes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Having described the overall architecture and capabilities of the FWS 10, a detailed description of this invention will now be presented.

In a true S-CDMA system, each user signal present at the input of the RBU 12 is required to be timing phase (i.e. sub-chip, half-chip, and full-chip) aligned with the RBU's master timing. In the presently preferred embodiment of this invention the S-CDMA requirements are expanded to include frame and super-frame alignment. As a result, each user signal present at the input of the RBU 12 is timing phase, half-chip, full-chip, frame, and super-frame aligned with the RBU's master timing. Super-frame alignment is accomplished dynamically through asynchronous communications between the RBU 12 and each individual SU 14. The RBU 12 initiates a two-step process with each SU 14 that is brought on-line in the FWS 10. The first step is for the SU 14 to achieve super-frame alignment with the RBU's transmitted signal. The RBU-to-SU link is referred to as the "forward link". Conversely, the SU-to-RBU link is the "reverse link".

The SU 14 synchronizes to the RBU's transmitted signal by searching the incoming data and locating two time-aligned 5-symbol sync codes, collectively referred to as S, which the RBU 12 loads into the beginning of each frame. Once this is accomplished, the SU 14 searches until it finds three consecutive frames containing in their respective order: S~,S,S. (S~ denotes the logical inverse of S). There is no S~, however, on the reverse link, as it is not needed due to system parameter constraints. The SU 14 has, at this point, established its own super-frame boundary. Due to hardware and RF-path delays, the SU 14 super-frame boundary is typically delayed several symbol times from the RBU's super-frame boundary. With the SU's received super-frame timing established, the SU 14 begins to transmit frames to the RBU 12 across the reverse link. Initially, the SU 14 delays the transmitter super-frame boundary from the receiver boundary by an amount such that the SU 14 signal is super-frame aligned at the RBU 12 for a case where the RF-path delay is zero (i.e., physical distance between the RBU 12 and SU 14 is zero meters).

The second step in this two-step process is for circuitry within the RBU's receiver to search the incoming data for the sync code. Due to hardware and RF-path delays, the super-frame boundary will once again be delayed several symbols in time. Once the sync code is consistently found, the RBU 12 calculates the symbol delay, N, between the super-frame boundary of the RBU 12 and the SU 14. Using this offset, the RBU 12 commands the SU 14 to delay its transmitted signal by N symbols. The maximum line-of-sight distance allowed in the FWS 10 between the RBU 12 and a SU 14 ultimately causes N to be constrained to: ($0 \leq N \leq 15$ symbols), although in other embodiments more or less than a maximum 15 symbol delay may exist. This operation drives the two super-frame boundaries together in time at the RBU 12. At this time super-frame alignment has been achieved with that SU 14, and communications with the SU 14 is switched from asynchronous to synchronous. This same two step procedure is performed by the RBU 12 for each new SU 14 that is brought on-line.

Figure 3A:
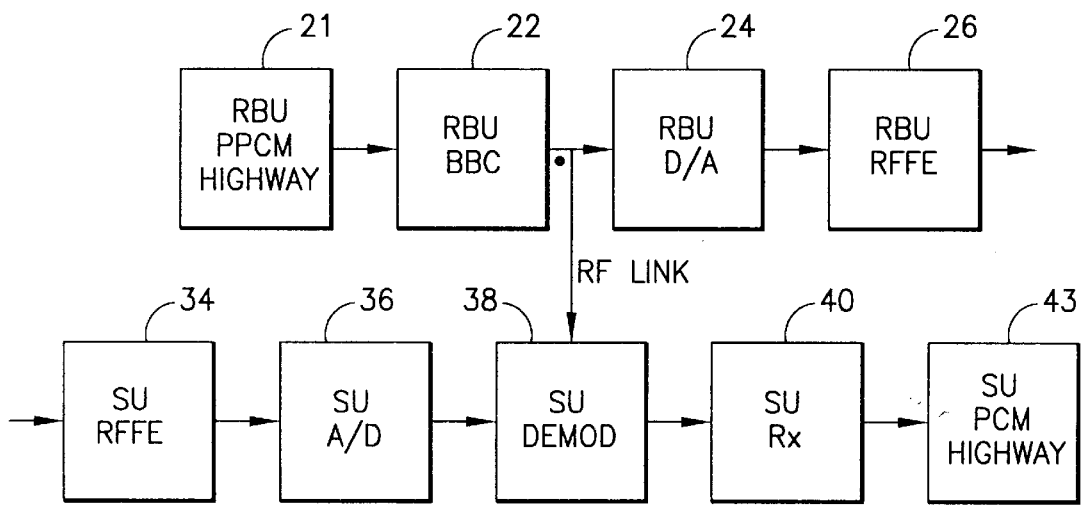
FIGS. 3A and 3B are block diagrams that illustrate a forward link signal path and a reverse link signal path, respectively.
Figure 3B:
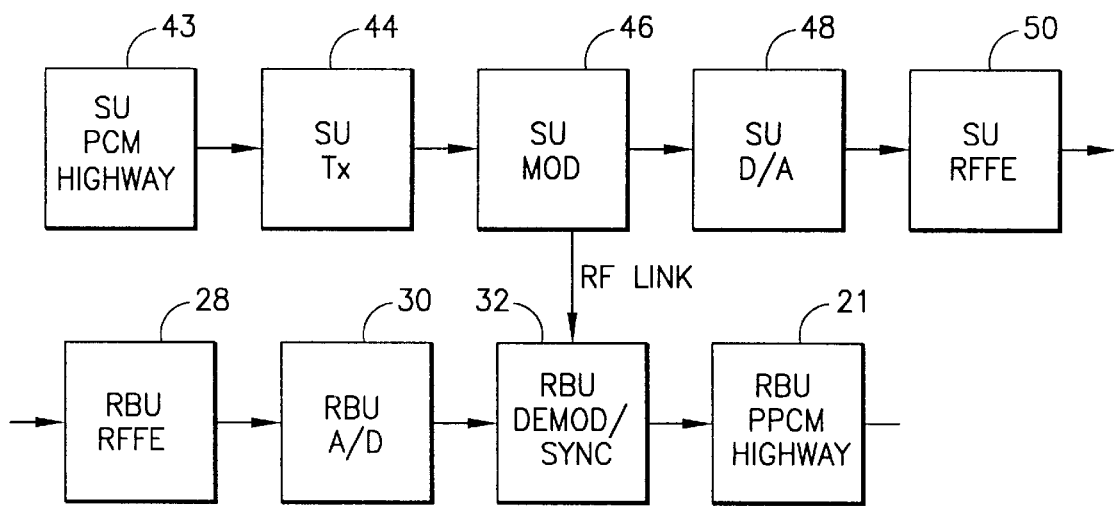
Figure 4:
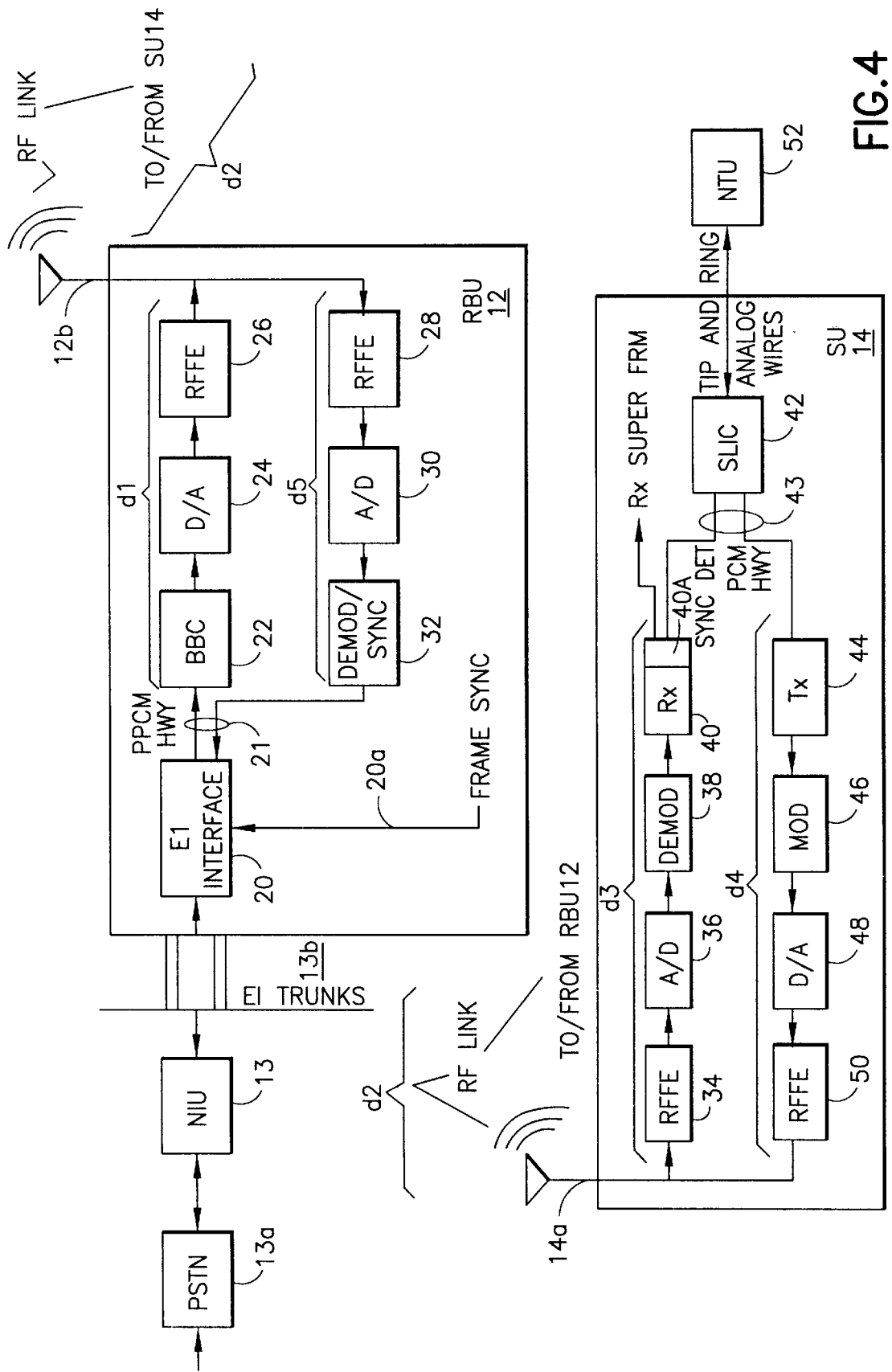
FIG. 4 is a more detailed block diagram of the RBU and SU of FIG. 1, and which further illustrates various system time delays.

Referring now to FIGS. 3A, 3B and 4, the procedure for establishing S-CDMA FWS 10 super-frame alignment is described in greater detail. Both the RBU 12 and SU 14 are comprised of various analog, digital, and RF hardware which operate in conjunction with antennas 12b and 14a.

An incoming call from the PSTN 13a passes through the NIU 13 to 64 Kbps per channel E1 trunks 13b and then to a RBU-resident E1 interface 20. The E1 interface 20 optionally performs an A-Law ADPCM algorithm for the compression of the 64 Kbps channel to a 32 Kbps channel that is placed on a PCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20. For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 41 to a network termination unit (NTU) 52. In the reverse direction a call originates at the NTU 52 and passes through the SLIC 42 and PCM Highway 41 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. The FrameSync signal 20a is strobed to designate the beginning of a new frame of data at the input/output of the PPCM Highway 21. As was stated previously, in the FWS 10 all data is grouped into equal-sized packets referred to as frames, which in turn are grouped into super-frames with, for example, three frames making up one super-frame.

A presently preferred frame structure is shown in the following Table 1. There are 340 symbols per frame, and the duration of one symbol is 47.4 microseconds.

TABLE 1

FRAME STRUCTURE

| Symbol Locations | Contents |
| --- | --- |
| 4–0 | Sync Code, S or S⁻ |
| 84–5 | Data Field #1 |
| 89–85 | Control Byte #1, C1 |
| 169–90 | Data Field #2 |
| 174–170 | Control Byte #2, C2 |
| 254–175 | Data Field #3 |
| 259–255 | Control Byte #3, C3 |
| 339–260 | Data Field #4 |

In the presently preferred embodiment a rate ¾ punctured bit approach is used, yielding 544 bits per frame.

In FIG. 4 various delay numbers, $d_i$, are designated. These represent time delays which data incurs as it flows through the FWS 10. It is noted that $d_1$, $d_3$, $d_4$, and $d_5$ are all hardware delays that have known values and that remain fixed over time. The delay parameter $d_2$, however, is an RF-path delay that is not fixed. In general, the value of $d_2$ is dependent upon two factors. The first is the physical distance of the SU antenna 14a from the RBU antenna 12b, which remains constant after installation of the SU 14 at a given geographic site. The second is the local environmental conditions which exist at any given time between the RBU 12 and SU 14. These environmental conditions tend to be dynamic and, thus, the forward/reverse link delay are unique for each SU 14 in the FWS 10.

Therefore, in order to establish synchronization of the S-CDMA FWS 10 at the superframe level, the RBU 12 dynamically adjusts the timing of each individual SU 14 such that all SUs are frame aligned at the input of the RBU 12.

The master timing for all SUs 14 is controlled with the FrameSync signal 20a. During normal system operation, the RBU 12 sends the SU 14 a message, and the SU 14 replies back to the RBU 12.

The largest data unit present in the FWS 10 is the super-frame, which consists of three of the frames shown in Table 1. A super-frame is constructed such that on the forward link, frames #2 and #3 have sync fields containing S, and frame #1 contains S⁻ (where S⁻ is the logical inverse of S). On the reverse link, however, all three frames contain S in their respective synchronization fields.

Consider the case in which the RBU 12 sends a message to the SU 14 across the forward link. Until the entire super-frame alignment procedure is completed, the RBU 12 and SU 14 are assumed to communicate with each other over an asynchronous side channel. The super-frame boundary, which corresponds to the point in time immediately before the synchronization field of frame #1, effectively incurs a time delay of $(D_1=d_1+d_2+d_3)$ before reaching the Receiver (Rx 40) of the SU 14.

Figure 5A:
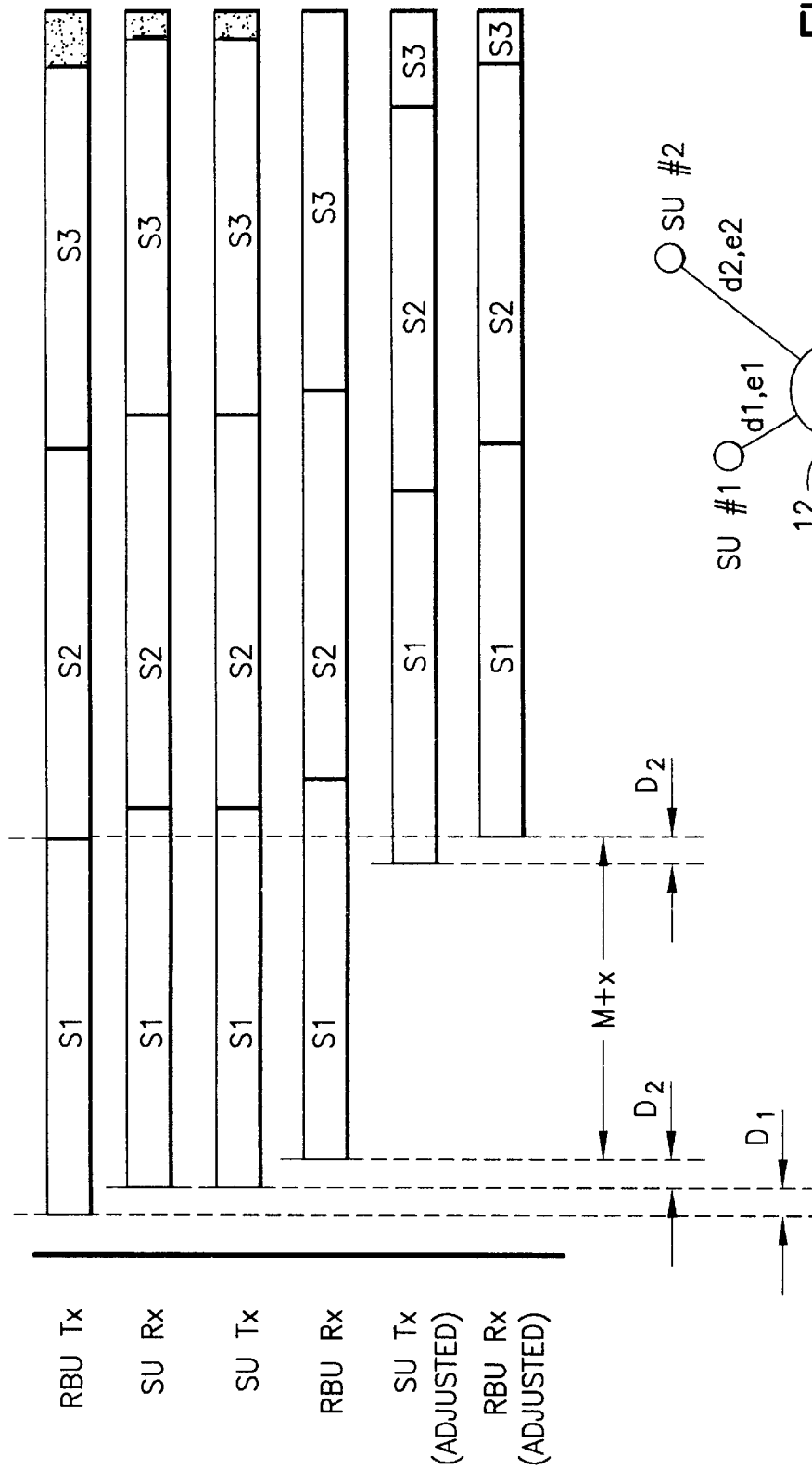
FIG. 5A is an overall system timing diagram, and which further illustrates various time delays.
Figure 5B:
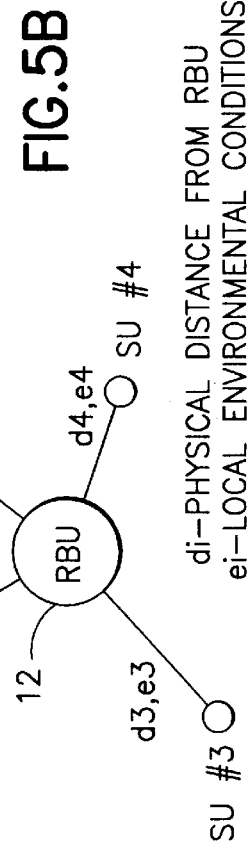
FIG. 5B is a diagram showing various RBU and SU delays.

In order to graphically track the time delays through the FWS 10, reference is now also made to FIGS. 5A and 5B. Since the delay $d_2$ is primarily a function of distance, the SU 14 must be able to find the super-frame boundary regardless of the SU-RBU distance (and environmental conditions present (see FIG. 5B)). The SU Rx 40 includes a circuit referred to as a Synchronization Detector (SyncDet) 40a. Because it is not known by the SU 14 where the super-frame boundary is, a state machine searches the entire incoming bit stream until it finds S⁻, S, and S exactly one frame apart. Once this is accomplished, the SU 14 is "synchronized" to the forward link. The SU 14 then generates its own super-frame pulse, RxSuperFrm (shown also in FIG. 6), which marks the boundary of the received super-frame.

The SU 14 then replies to the RBU 12 over the reverse link. The data transmitted from the SU 14 to the RBU 12 incurs a time delay of $(D_2=d_4+d_2+d_5)$. Since $d_2$ is variable across SUs 14, the position of the super-frame boundary, at this point, is different among all the SUs at the input of the RBU 12. Due to system power constraints, however, $2*d_2$ (i.e. round trip distance) has a maximum RF path delay of, by example, 15 symbols. Although $d_2$ varies across SUs 14, all other delays are fixed and known. Thus, the SU 14 first transmits a super-frame that is delayed from the received super-frame in such a way that the SU signal present at the input of the RBU 12 is super-frame aligned with the RBU's master timing, in the case where the RF path delay is zero. This timing slip value is M symbols, and provides a first estimate of the number of symbol delays required to yield super-frame alignment. At the most, the alignment is off by 15 symbol times. The RBU Demod/Sync block 32 contains circuitry which locates the super-frame boundary by searching for the sync code, S, in the incoming frames. In an environment in which there is adequate signal-to-noise ratio, the sync code is anywhere from 0 to 15 symbols late from the start point, depending upon the line-of-sight distance between the RBU 12 and the SU 14. Once the super-frame boundary is found, the RBU Demod/Sync block 32 calculates a parameter x, which is the difference in the number of symbols between the RBU received super-frame and the super-frame as designated by the PPCM Highway 21.

The objective in the super-frame aligned S-CDMA FWS 10 is to cause the SU 14 transmitter to delay its data such that the parameter x is driven to zero. The RBU 12 accomplishes this by sending a new message to the SU 14 in which it commands the SU 14 to delay its transmitted data by M+x number of symbols.

Figure 6:
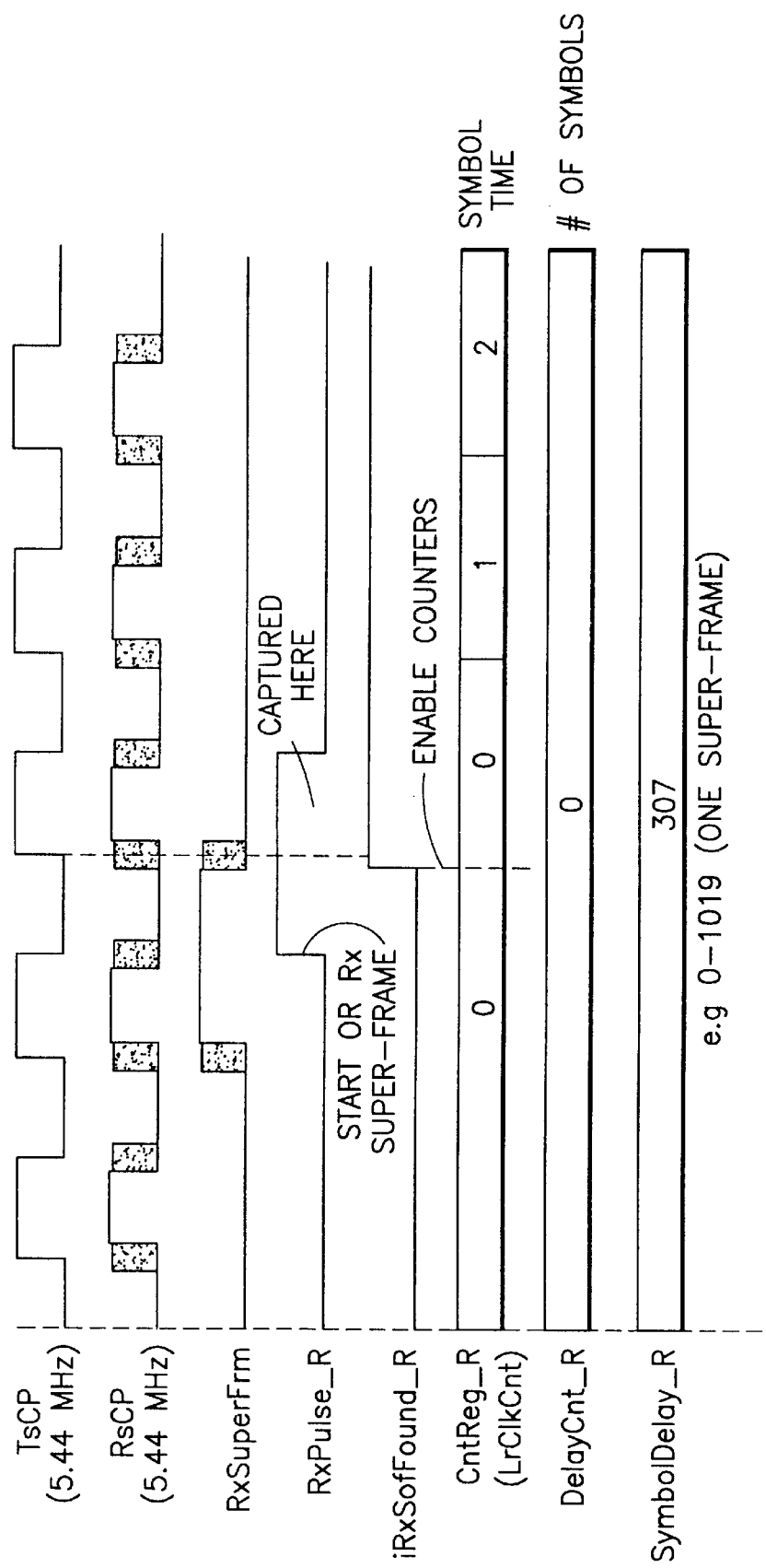
FIG. 6 is a timing diagram that illustrates the synchronization of SU transmitter to receiver timing.
Figure 7:
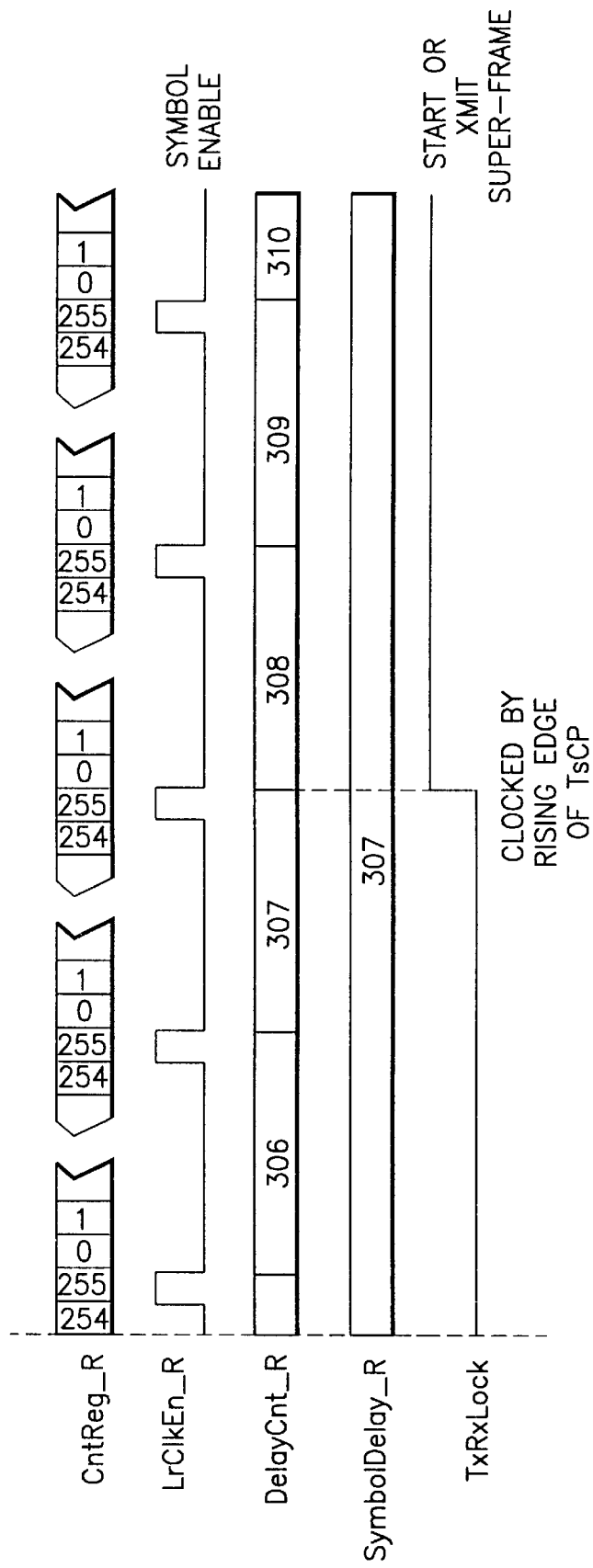
FIG. 7 is a timing diagram that illustrates a SU transmitter symbol slip operation.

Reference is now made to FIGS. 6 and 7 to show the response of the SU 14 to the RBU 12 command. It should be noted that the same operation described here is also used in performing the first slip of M. The first step which the SU 14 performs is to drive its RsCP (receive clock) and TsCP (transmit clock) to a minimal phase difference. There are 256 TsCP and RsCP clocks per symbol. Since the phase difference cannot be driven exactly to zero, there is some uncertainty as to where the exact edges of RsCP and RxSuperFrm occur with respect to TsCP (denoted by the shaded area). It is guaranteed, however, that RXSuperFrm is stable at the falling edge of TsCP. Thus, the transmitter 44 gates this pulse as RxPulse_R on the falling edge of TsCP. On the next rising edge of TsCP, the signal iRxSofFound_R is asserted high for indicating that the transmitter 44 has found the super-frame boundary of the receiver 40. A counter labeled CntReg_R begins to count from zero at this point. Every 256 counts of this counter represents one symbol time, which are counted by another counter DelayCnt_R. At this time a register SymbolDelay_R holds the value M+x that was discussed above. When DelayCnt_R=SymbolDelay_R, the transmitter 44 super-frame boundary is declared. Referring again to FIG. 5A, this corresponds to the SU Tx (Adjusted) timing. Taking into account the various path delays, the RBU Rx (Adjusted) super-frame boundary thus identically matches the RBU Tx boundary.

At this point, super-frame aligned S-CDMA communications have been established between the RBU 12 and the SU 14, which enables the SU 14 to begin and end its transmissions at super-frame boundaries that are associated with the timing of the E1 trunks at the E1 Interface 20. Communications between the RBU 12 and SU 14 can then be switched from the asynchronous side channel to a synchronous channel using an assigned PN spreading code. In the presently preferred embodiment the SU 14 is first assigned to an unused traffic channel and communications between the RBU 12 and the SU 14 is tested. Assuming that the test is passed, the traffic channel PN code is relinquished by the SU 14, which then begins monitoring a forward synchronous channel to detect incoming messages, such as pages, from the RBU 12. At this juncture a voice or data transmission is ready to be performed. When a call is to be made, the SU 14 makes a request on one of the plurality of reverse synchronous side channels using the Slotted Aloha technique, as described in further detail below.

This same entire process is repeated for each SU 14 brought on-line in the system. After being brought on-line, the SU 14 will store the correct timing and power control information in a non-volatile memory in the event that the SU 14 later loses synchronization with the forward link.

The super-frame alignment process discussed above has the benefit of enabling the reverse synchronous side channels to be operated in the Slotted ALOHA protocol. The Slotted ALOHA protocol can be shown to be approximately twice as efficient as the standard ALOHA multiple access protocol, where just a few symbol overlap in transmissions between two transmitters can be enough to cause a collision. In the Slotted ALOHA technique used by this invention, wherein the SUs 14 are all super-frame aligned, the only chance for collision occurs at the beginning of a super-frame.

In this approach some number of dedicated PN codes (e.g., six) are used to provide synchronous access or side channels to the RBU 12. When a particular SU 14 telephone goes off-hook, assuming that the SU 14 is already synchronized with the system as described above, the SU 14 selects at random one of the synchronous side channels and begins transmission at the appropriate super-frame time boundary (assuming that the synchronous side channels operate in the Slotted ALOHA fashion). The SU 14 transmits a three frame burst (i.e., one super-frame) requesting an active channel. The SU 14 then waits for some period of time to allow the RBU 12 to receive, interpret and respond to the request. This waiting period may be, for example, on the order of 32 milliseconds. If there is no response in this time period, the SU 14 assumes that another SU has attempted to use the same side channel during the same super-frame slot and that a collision occurred. The SU 14 then waits a random number of super-frames and transmits another super-frame aligned burst. In the preferred embodiment the SU 14 also again selects at random the side channel on which to attempt the access, thereby even further minimizing the probability of another collision. This process is repeated until there is a positive acknowledgment from the RBU 12, at which time the SU 14 is commanded to switch to a particular active forward and reverse channel PN code pair and begin reception and transmission.

Although described in the context of various numbers of symbols, delays, bit and symbol rates, etc., it should be realized that these are exemplary, and are not to be read in a limiting sense upon the practice of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a synchronous Code Division Multiple Access (S-CDMA) radio frequency communication system having a host transceiver unit and a plurality of user transceiver units, comprising steps of:

defining a super-frame to be comprised of N sequential frames of data;

for a user transceiver unit obtaining access to the host transceiver unit, receiving frames of data transmitted by the host transceiver unit and initially aligning a receiver and a transmitter timing of the user transceiver unit to a super-frame boundary of the received frames;

transmitting frames of data from the user transceiver unit to the host transceiver unit using the initial timing alignment;

detecting at the host transceiver unit a difference between the arrival of the transmitted frames of data and a super-frame boundary; and transmitting a timing correction parameter from the host transceiver unit to the user transceiver unit in order to align the transmitted frames of data to the super-frame boundary.

2. A method as in claim 1, wherein the timing correction parameter is expressed in a number of symbols.

3. A method as in claim 1, wherein the steps of receiving and transmitting frames of data occur on an asynchronous side channel, and further comprising a step of switching the communication between the user transceiver unit and the host transceiver unit from the asynchronous side channel to a synchronous communication channel.

4. A method as in claim 1, wherein N is equal to three.

5. A method as in claim 1, wherein the step of defining a super-frame to be comprised of N sequential frames of data defines a first frame of the super-frame, in a direction from the host transceiver unit to the user transceiver unit, to have a synchronization field that differs from the synchronization field of each of the N–1 frames of data of the super-frame, and wherein the step of initially aligning includes a step of detecting the synchronization field of the first frame of the super-frame.

6. A method as in claim 1, and further comprising a step of sending a message from a super-frame aligned user transceiver unit to the host transceiver unit using a Slotted ALOHA protocol.

7. A synchronous Code Division Multiple Access (S-CDMA) radio frequency communication system having a host transceiver unit and a plurality of user transceiver units, said host and user transceiver units communicating using super-frames each comprised of N sequential frames of data, individual ones of said user transceiver units comprising a receiver for receiving frames of data transmitted by the host transceiver unit and means for initially aligning a timing of said receiver and also a timing of a transmitter to a super-frame boundary of the received frames for transmitting frames of data to the host transceiver unit using the initial timing alignment; said host transceiver unit comprising means for detecting a difference between the arrival of the transmitted frames of data and a super-frame boundary and for transmitting a timing correction parameter to said user transceiver unit in order to align the transmitted frames of data to the super-frame boundary.

8. A system as in claim 7, wherein the timing correction parameter is expressed in a number of symbols.

9. A system as in claim 7, wherein the alignment of the user transceiver unit occurs on an asynchronous side channel, and wherein communications between said user transceiver unit and said host transceiver unit is subsequently switched from said asynchronous side channel to a synchronous communication channel.

10. A system as in claim 7, wherein N is equal to three.

11. A system as in claim 7, wherein a first frame of a super-frame, in a direction from said host transceiver unit to said user transceiver unit, has a synchronization field that differs from the synchronization field of each of the N−1 frames of data of the super-frame, and wherein said means for initially aligning includes means for detecting the synchronization field of the first frame of the super-frame.

12. A system as in claim 7, wherein a super-frame aligned user transceiver unit includes means for sending a message to said host transceiver unit using a Slotted ALOHA protocol.

13. A method for operating a synchronous Code Division Multiple Access (S-CDMA) radio frequency communication system having a radio base unit (RBU) and a plurality of subscriber units (SUs), comprising steps of:

defining a super-frame to be comprised of N sequential frames of data;

time aligning a SU to a RBU super-frame boundary using an asynchronous channel between the SU and the RBU; and subsequently transmitting a super-frame aligned burst from the SU to the RBU using a synchronous channel in accordance with a Slotted ALOHA system access protocol.

14. A method as in claim 13, wherein the step of aligning includes steps of:

receiving frames of data transmitted by the RBU at the SU and initially aligning a receiver and a transmitter timing of the SU to a super-frame boundary of the received frames;

transmitting frames of data from the SU to the RBU using the initial timing alignment;

detecting at the RBU a difference between the arrival of the transmitted frames of data and a super-frame boundary; and transmitting a timing correction parameter from the RBU to the SU in order to align the transmitted frames of data to the super-frame boundary.

15. A method as in claim 14, wherein the timing correction parameter is expressed as a number of symbols.

16. A method as in claim 13, wherein N is equal to three.

17. A method as in claim 14, wherein the step of defining a super-frame to be comprised of N sequential frames of data defines a first frame of the super-frame, in a direction from the RBU to the SU, to have a synchronization field that differs from the synchronization field of each of the N-1 frames of data of the super-frame, and wherein the step of initially aligning includes a step of detecting the synchronization field of the first frame of the super-frame.

18. A method as in claim 13, wherein if the SU does not receive a response from the RBU after transmitting the super-frame aligned burst, the SU delays a random number of super-frames and transmits another super-frame aligned burst.

19. A method as in claim 13, wherein if the SU does not receive a response from the RBU after transmitting the super-frame aligned burst, the SU delays a random number of super-frames and transmits another super-frame aligned burst on a randomly selected synchronous channel.

20. A method as in claim 19, wherein a super-frame aligned burst is comprised of N frames.

* * * * *